US012134452B1

(12) United States Patent
Kalnins et al.

(10) Patent No.: US 12,134,452 B1
(45) Date of Patent: Nov. 5, 2024

(54) SYSTEMS AND METHODS FOR IMPROVING ACCELERATION PERFORMANCE OF MARINE VESSELS

(71) Applicant: Brunswick Corporation, Mettawa, IL (US)

(72) Inventors: Jared D. Kalnins, Fond du Lac, WI (US); Mitchell J. Baer, Fond du Lac, WI (US); Daniel A. Roske, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 225 days.

(21) Appl. No.: 17/672,054

(22) Filed: Feb. 15, 2022

(51) Int. Cl.
| | |
|---|---|
| *B60L 15/20* | (2006.01) |
| *B60L 58/12* | (2019.01) |
| *B63H 21/17* | (2006.01) |
| *B63H 21/21* | (2006.01) |
| *H02P 23/20* | (2016.01) |

(52) U.S. Cl.
CPC .............. *B63H 21/17* (2013.01); *B60L 15/20* (2013.01); *B60L 58/12* (2019.02); *B63H 21/21* (2013.01); *H02P 23/20* (2016.02); *B60L 2200/32* (2013.01); *B63H 2021/216* (2013.01)

(58) Field of Classification Search
CPC .. B63H 21/17; B63H 21/21; B63H 2021/216; B60L 15/20; B60L 58/12; B60L 2200/32; H02P 23/20
USPC .......................................................... 701/21
See application file for complete search history.

(56) References Cited

U.S. PATENT DOCUMENTS

| | | | |
|---|---|---|---|
| 6,273,771 B1 | 8/2001 | Buckley et al. | |
| 7,214,110 B1 | 5/2007 | Ehlers et al. | |
| 8,762,022 B1 | 6/2014 | Arbuckle et al. | |
| 9,481,254 B1 | 11/2016 | Schulz et al. | |
| 9,555,869 B1 | 1/2017 | Arbuckle et al. | |
| 9,764,812 B1 | 9/2017 | Arbuckle et al. | |
| 11,215,128 B1 | 1/2022 | Poirier et al. | |
| 2004/0090195 A1 | 5/2004 | Motsenbocker | |
| 2007/0077830 A1* | 4/2007 | Rzadki | B63G 13/02 440/6 |
| 2010/0178815 A1* | 7/2010 | Leblanc | B63B 34/10 440/1 |
| 2018/0134162 A1* | 5/2018 | Biebach | B63H 21/21 |
| 2020/0321898 A1* | 10/2020 | Hellinga | H02P 6/06 |

(Continued)

*Primary Examiner* — Ian Jen
*Assistant Examiner* — Hossam M Abd El Latif
(74) *Attorney, Agent, or Firm* — Andrus Intellectual Property Law, LLP

(57) ABSTRACT

An electric marine propulsion system for a marine vessel is provided. The system includes a power storage system, an electric motor powered by the power storage system and configured to rotate a propulsor to propel the marine vessel, and a control system configured to operate the electric motor in a speed control mode to generate a variable propulsion output so as not to exceed a rated operation value and an open loop parameter control mode such that the electric motor is operated to exceed the rated operation value to generate a maximum propulsion output. The control system is further configured to receive an operator demand to accelerate the marine vessel; determine whether the operator demand exceeds a predetermined acceleration threshold; and operate the electric motor in the open loop parameter control mode to generate the maximum propulsion output.

20 Claims, 6 Drawing Sheets

(56) References Cited

U.S. PATENT DOCUMENTS

2021/0253213 A1\* 8/2021 Sato .................. B63H 20/08
2023/0033010 A1\* 2/2023 Callaghan .............. B63H 25/50

\* cited by examiner

SYSTEMS AND METHODS FOR IMPROVING ACCELERATION PERFORMANCE OF MARINE VESSELS

FIELD

The present disclosure generally relates to propulsion systems for marine vessels, and particularly to systems and methods for boosting vessel acceleration provided by marine propulsion systems in response to an operator demand.

BACKGROUND

Electric propulsion systems comprising an electric motor rotating a propeller are known. For example, on-board electric drive systems and outboard electric drive systems have been developed for propelling marine vessels. Different power supply arrangements for powering electric propulsion systems are also known. Such power storage systems includes one or more batteries or banks of batteries, and may include other storage devices such as one or more ultracapacitors, fuel cells, flow batteries, and other devices capable of storing and outputting electric energy.

The following U.S. Patents provide background information and are incorporated herein by reference, in entirety.

U.S. Pat. No. 6,273,771 discloses a control system for a marine vessel incorporating a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,214,110 discloses an acceleration control system which allows the operator of a marine vessel to select an acceleration profile to control the engine speed of a marine vessel from an initial starting speed to a final desired speed. When used in conjunction with tow sports, such as wake boarding and water skiing, the use of acceleration profile provides consistent performance during the period of time when a water skier is accelerated from a stationary position to a full speed condition.

U.S. Pat. No. 8,762,022 discloses a system and method for efficiently changing controlled engine speed of a marine internal combustion engine in a marine propulsion system for propelling a marine vessel. The system responds to the operator changing the operator-selected engine speed, from a first-selected engine speed to a second-selected engine speed, by predicting throttle position needed to provide the second-selected engine speed, and providing a feed forward signal moving the throttle to the predicted throttle position, without waiting for a slower responding PID controller and/or overshoot thereof, and concomitant instability or oscillation, and then uses the engine speed control system including any PID controller to maintain engine speed at the second-selected engine speed.

U.S. Pat. No. 9,555,869 discloses a method for setting an engine speed of an internal combustion engine in a marine propulsion device of a marine propulsion system to an engine speed setpoint that includes determining the engine speed setpoint based on an operator demand and predicting a position of a throttle valve that is needed to achieve the engine speed setpoint. The method also includes determining a feed forward signal that will move the throttle valve to the predicted position, and after moving the throttle valve to the predicted position, adjusting the engine speed with a feedback controller so as to obtain the engine speed setpoint. An operating state of the marine propulsion system is also determined. Depending on the operating state, the method may include determining limits on an authority of the feedback controller to adjust the engine speed and/or determining whether the operator demand should be modified prior to determining the engine speed setpoint.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, an electric marine propulsion system for a marine vessel is provided. The electric marine propulsion system includes a power storage system, an electric motor powered by the power storage system and configured to rotate a propulsor to propel the marine vessel, and a control system configured to operate the electric motor in a speed control mode to generate a variable propulsion output so as not to exceed a rated operation value and an open loop parameter control mode such that the electric motor is operated to exceed the rated operation value to generate a maximum propulsion output. The control system is further configured to: operate the electric motor in the speed control mode, receive an operator demand for the electric motor to accelerate the marine vessel, determine whether the operator demand exceeds a predetermined acceleration threshold; and based at least in part on a determination that the operator demand exceeds the predetermined acceleration threshold, operate the electric motor in the open loop parameter control mode to generate the maximum propulsion output.

In some embodiments, the rated operation value is a rated torque for the electric motor and operating the electric motor in the open loop parameter control mode comprises commanding the electric motor to generate a maximum torque output that exceeds the rated torque. In other embodiments, operating the electric motor in the open loop parameter control mode comprises providing a maximum current input to the electric motor.

In some embodiments, operating the electric motor in the speed control mode comprises commanding the electric motor to generate a variable torque output based on a comparison of a target speed of the electric motor or a target speed of the propulsor and a feedback signal representative of at least one of a measured speed of the electric motor or a measured speed of the propulsor.

In some embodiments, engagement of the open loop parameter control mode is further based in part on a determination that a charge level of the power storage system exceeds a minimum charge threshold.

In some embodiments, engagement of the open loop parameter control mode is further based in part on a determination that a temperature of the power storage system does not exceed a maximum temperature threshold.

In some embodiments, engagement of the open loop parameter control mode is further based in part on a determination that a tiller position exceeds a minimum tiller threshold.

In some embodiments, engagement of the open loop parameter control mode is further based in part on a determination that a gear system operably coupling the electric motor to the propulsor is in a forward position configured to enable the propulsor to propel the marine vessel in a forward direction.

In some embodiments, engagement of the open loop parameter control mode is further based in part on a determination that the operator demand for the electric motor to accelerate the marine vessel comprises a demand to increase a speed of the marine vessel.

In some embodiments, the control system is further configured to detect that the electric motor has achieved a threshold motor output; and transition operation of the electric motor from the open loop parameter control mode back to the speed control mode.

In some embodiments, the threshold motor output comprises at least one of a steady state speed of the electric motor or a steady state speed of the propulsor.

In some embodiments, the control system is further configured to transition operation of the electric motor from the open loop parameter control mode back to the speed control mode upon expiration of a predetermined time after engagement of the open loop parameter control mode.

In another embodiment, a method of controlling an electric marine propulsion system having an electric motor configured to operate in a speed control mode to generate a variable propulsion output and in an open loop parameter control mode to generate a maximum propulsion output to propel a marine vessel is provided. The method includes operating the electric motor in the speed control mode, receiving an operator demand for the electric motor to accelerate the marine vessel, determining whether the operator demand exceeds a predetermined acceleration threshold, based at least in part on a determination that the operator demand exceeds the predetermined acceleration threshold, transitioning operation of the electric motor from the speed control mode to the open loop parameter control mode, and operating the electric motor in the open loop parameter control mode to generate the maximum propulsion output.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

The present inventors have recognized a need for systems and methods to temporarily boost the acceleration performance of electric propulsion devices to reach an on-plane condition faster. As a marine vessel accelerates in a body of water, the hydrodynamic drag on the hull of the marine vessel increases with the speed until the hull is lifted above its bow wave and the wetted area of the marine vessel is reduced, thereby reducing the drag on the marine vessel. Accordingly, it is preferable to achieve this on-plane state as quickly as possible to improve operator satisfaction and comfort.

In the disclosed methods and systems, the motor of the electric propulsion system is operated to exceed its rated operation value, such as its rated current value or its rated torque, for a short amount of time to get the vessel on plane as quickly as possible. The motor is generally operated according to a closed loop control scheme in which the electric motor provides a torque that is less than or equal to the rated torque in order to achieve a target motor or propulsor speed, and the torque is adjusted based on a feedback signal indicative of the actual motor or propulsor speed. However, when the operator demands maximum acceleration of the vessel, the controller changes its operation of the electric motor from the closed loop control scheme into an open loop control scheme in which the motor is operated to immediately exceed the rated operation value in order to generate a maximum output. This high output operation is sustained for only a short period. Once the controller determines that the vessel is on plane, the excess current or torque is ramped out or otherwise removed so that the motor is no longer operated above the rated operation value, and the controller transitions operation of the electric motor from the open loop control scheme back in to the closed loop control scheme.

Figure 1:
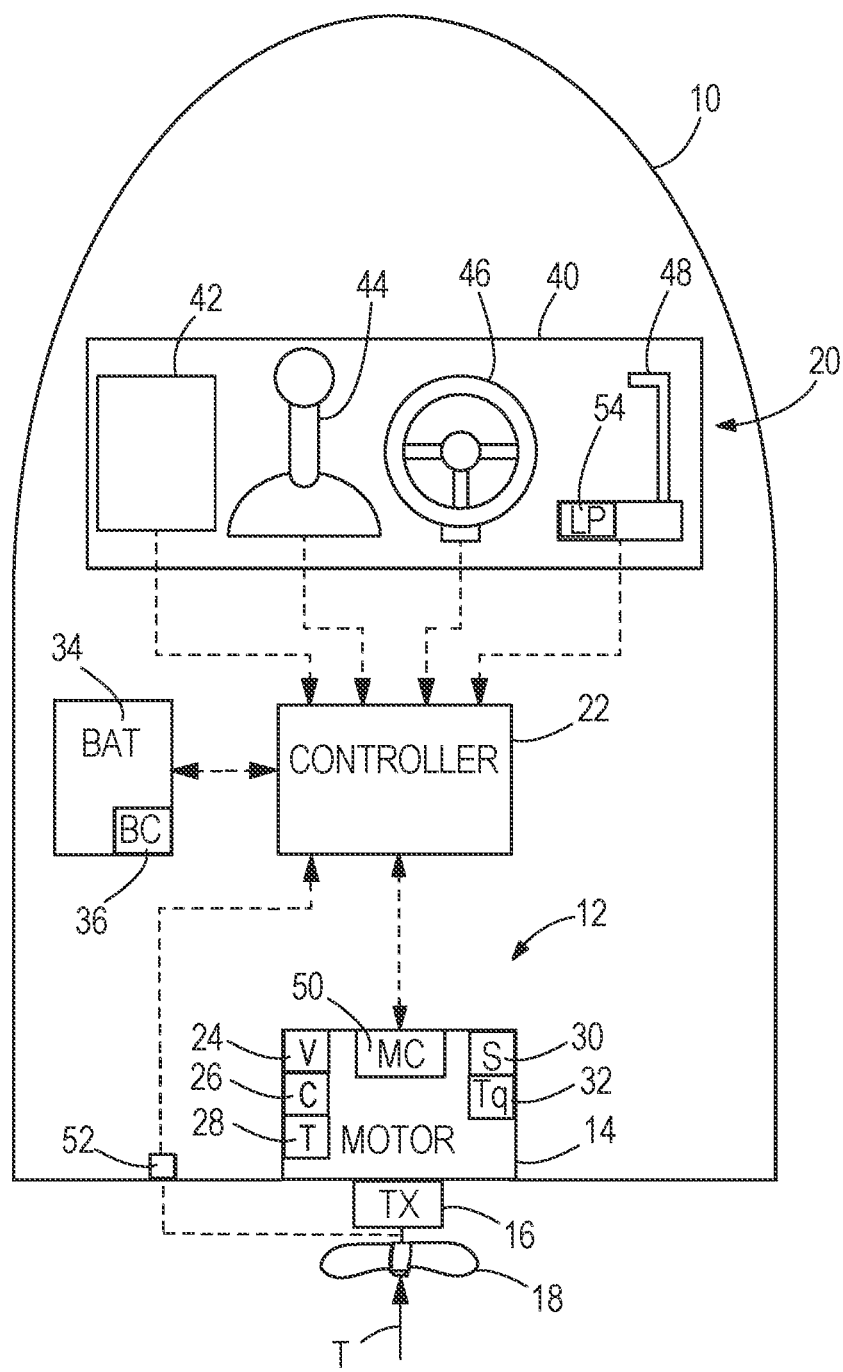
FIG. 1 is a schematic top view representation of an exemplary marine vessel configured to implement an acceleration boost procedure according to the present disclosure.

FIG. 1 depicts an exemplary embodiment of a marine vessel 10 having an electric marine propulsion system 12 configured to propel the marine vessel 10 in a direction instructed by an operator using a user interface system 20, or by a guidance system configured to automatically control steering of the marine vessel 10 to steer the vessel toward a predetermined location or global position. The electric marine propulsion system 12 includes at least one electric motor 14 configured to propel the marine vessel 10 by rotating a propeller 18. The motor 14 may be, for example, a brushless electric motor, such as a brushless DC motor. In other embodiments, the electric motor 14 may be a DC brushed motor, an AC brushless motor, a direct drive, a permanent magnet synchronous motor, an induction motor, or any other device that converts electric power to rotational motion. In certain embodiments, the electric motor 14 includes a rotor and a stator, as is well known in the relevant art. The electric motor 14 is associated with a rated operation value that, in various embodiments, may refer to a rated current value or a rated torque value at which the motor 14 can maintain continuous operation without undue wear or damage. However, the present inventors have recognized that the motor 14 can operate at an operation value exceeding the rated operation value (e.g., an overcurrent value or an overtorque value) for short amounts of time to achieve maximum propulsion outputs exceeding those achievable at the rated operation value without substantial negative impacts to the motor 14.

The electric motor 14 is electrically connected to and powered by a power storage system or battery 34. The battery 34 stores energy for powering the electric motor 14 and is rechargeable, such as by connection to shore power when the electric motor 14 is not in use. Various power storage devices and systems are known in the relevant art. The battery 34 may be a battery system configured to output DC power including one or more banks of batteries. In other embodiments, the power storage device 34 may include one or more fuel cells, flow batteries, ultracapacitors, and/or other devices capable of storing an outputting electric energy. In further embodiments, an inverter configured to output AC power from a DC power input is associated with or otherwise a component of the power storage system 34.

The power storage device 34 may further include a battery controller 36 configured to monitor and/or control aspects of the power storage device 34. For example, the battery controller 36 may receive inputs from one or more sensors within the power storage system 34, such as a temperature sensor configured to sense a temperature within a housing of the power storage system 34 where one or more batteries or other storage elements are located. The battery controller 36 may further be configured to receive information from current, voltage, and/or other sensors within the power storage system 34, such as to receive information about the voltage, current, and temperature of each battery cell within the power storage device 34. In addition to the temperature of the power storage system 34, the battery controller 36 may be configured to calculate a charge level of the power storage system 34. The battery charge level may refer to a state of charge value, or some other value representing the amount of energy currently available from the power storage device 34.

The electric motor 14 is operably connected to the propeller 18 and configured to rotate the propeller 18. As will be known to the ordinary skilled person in the relevant art, the propeller 18 may include one or more propellers, impellers, or other propulsor devices and that the term "propeller" may be used to refer to all such devices. In certain embodiments, such as that represented in FIG. 1, the electric motor 14 may be connected and configured to rotate the propeller 18 through a gear system or transmission 16. In such an embodiment, the gear system 16 translates rotation of a motor output shaft to a propeller shaft to adjust conversion of the rotation and/or to disconnect the propeller shaft from the drive shaft, as is sometimes referred to in the art as a "neutral" position where rotation of the drive shaft is not translated to the propeller shaft. Various gear systems or transmissions 16 are well known in the relevant art. In other embodiments, the electric motor 14 may directly connect to the propeller shaft such that rotation of the drive shaft is directly transmitted to the propeller shaft at a constant and fixed ratio.

Each electric motor 14 may be associated with a motor controller 50 that is configured to control power to the electric motor 14, such as to the stator winding thereof. The motor controller 50 is configured to control the function and output of the electric motor 14, such as controlling the torque outputted by the motor, the rotational speed of the motor 14, as well as the input current, voltage, and power supplied to and utilized by the motor 14. In one arrangement, the motor controller 50 controls the current delivered to the stator windings via leads which input electrical energy to the electric motor to induce and control rotation of the rotor.

Sensors may be configured to sense the power, including the current and voltage delivered to the motor 14. For example, a voltage sensor 24 may be configured to sense the input voltage to the motor 14 and a current sensor 26 may be configured to measure input current to the motor 14. Accordingly, power delivered to the motor 14 can be calculated and such value can be used for monitoring and controlling the electric propulsion system 12, including for monitoring and controlling the motor 14. In the depicted example, the voltage and current sensors 24, 26 may communicatively connected to the motor controller 50 in order to provide measurement of the voltage and current supplied to the motor 14. The motor controller 50 is configured to provide appropriate current and/or voltage to meet the demand for controlling the motor 14. For example, a demand input may be received at the motor controller 50 from the central controller 22, such as based on an operator command at a helm input device, such as a throttle lever 48. In certain embodiments, the motor controller 50, voltage sensor 24, and current sensor 26 may be integrated into a housing of the electric motor 14, although in other embodiments the motor controller 50 may be separately housed.

Various other sensors may be configured to measure and report parameters of the electric motor 14. For example, the electric motor 14 may include means for measuring and determining the torque, rotation speed (motor speed), temperature, vibration, or any other parameter. In the depicted example, the electric motor 14 includes a temperature sensor 28 to sense a temperature of the motor 14, a speed sensor 30 configured to measure a rotational speed of the motor 14, and a torque sensor 32 for measuring the torque output of the motor 14. A propeller speed sensor 52 may be configured to measure a rotational speed of the propeller 10. For example, the propeller speed sensor 52 and/or the motor speed sensor 30 may be a Hall Effect sensor or other rotation sensor that utilizes capacitive or inductive measuring techniques. In various implementations, one or more of the parameters, such as the speed, torque, or power, may be calculated based on other measured parameters or characteristics. For example, the torque exerted by the motor 14 may be calculated based on power characteristics in relation to the rotation speed of the electric motor 14, for example. In addition, the speed of the marine vessel 10 is directly proportional to the speed of the propeller 18 as measured by the propeller speed sensor 52, and therefore the speed of the marine vessel 10 may be calculated based on measurements obtained by the propeller speed sensor 52.

Each controller (i.e., a central controller 22, the battery controller 36, and the motor controller 50) in the control system may comprise a processor and a storage device, or memory, configured to store software and/or data utilized for controlling and/or tracking operation of the electric propulsion system 12. The memory may include volatile and/or non-volatile systems and may include removable and/or non-removable media implemented in any method or technology for storage of information. The storage media may include non-transitory and/or transitory storage media, including random access memory, read only memory, or any other medium which can be used to store information and be accessed by an instruction execution system, for example. An input/output system (I/O) system provides communication between the control system including the central controller 22 and peripheral devices.

The central controller 22, which in the embodiment shown in FIG. 1 is a propulsion control module (PCM), communicates with the battery controller 36 and the motor controller 50 via a communication link such as a CAN bus as described in U.S. Pat. No. 6,273,771, incorporated by reference herein. The controller 22 also receives input from and/or communicates with one or more user interfaces in a user interface system 20 via the communication link, which in some implementations may be the same communication link as utilized for communication between the motor controller 50, battery controller 36, and central controller 22.

The user interface devices can include a display 42, a joystick 44, a steering wheel 46, and a throttle/shift lever 48. In various embodiments, the display 42 may be, for example, part of an onboard management system, such as the VesselView™ by Mercury Marine of Fond du Lac, Wisconsin. The joystick 44 and the steering wheel 46 may communicate with the central controller 22 to effectuate steering control over the propulsion system 12. For example, the joystick 44 may be utilized to provide lateral and rotational steering inputs to the propulsion system 12 during docking maneuvers. The throttle/shift lever 48 is provided to permit an operator to input thrust commands, including both a magnitude and a direction of thrust. A lever position sensor 54 may be placed anywhere on the throttle/shift lever 48 in order to sense the position of the lever 48. In the depicted embodiment, the position sensor 54 is connected to the control lever 48 such that rotation of the lever 48 causes equal rotation of the position sensor 54 such that the position and the rate of change of position of the lever 48 can be determined by the position sensor 54. The position sensor 54 may be any angular position sensor and may provide an analog output or a digital output of position to the central controller 22. For example, the position sensor 54 may be a programmable magnetic encoder, a clinometer, a Hall Effect sensor, a potentiometer, a rotary encoder, or the like.

Figure 2:
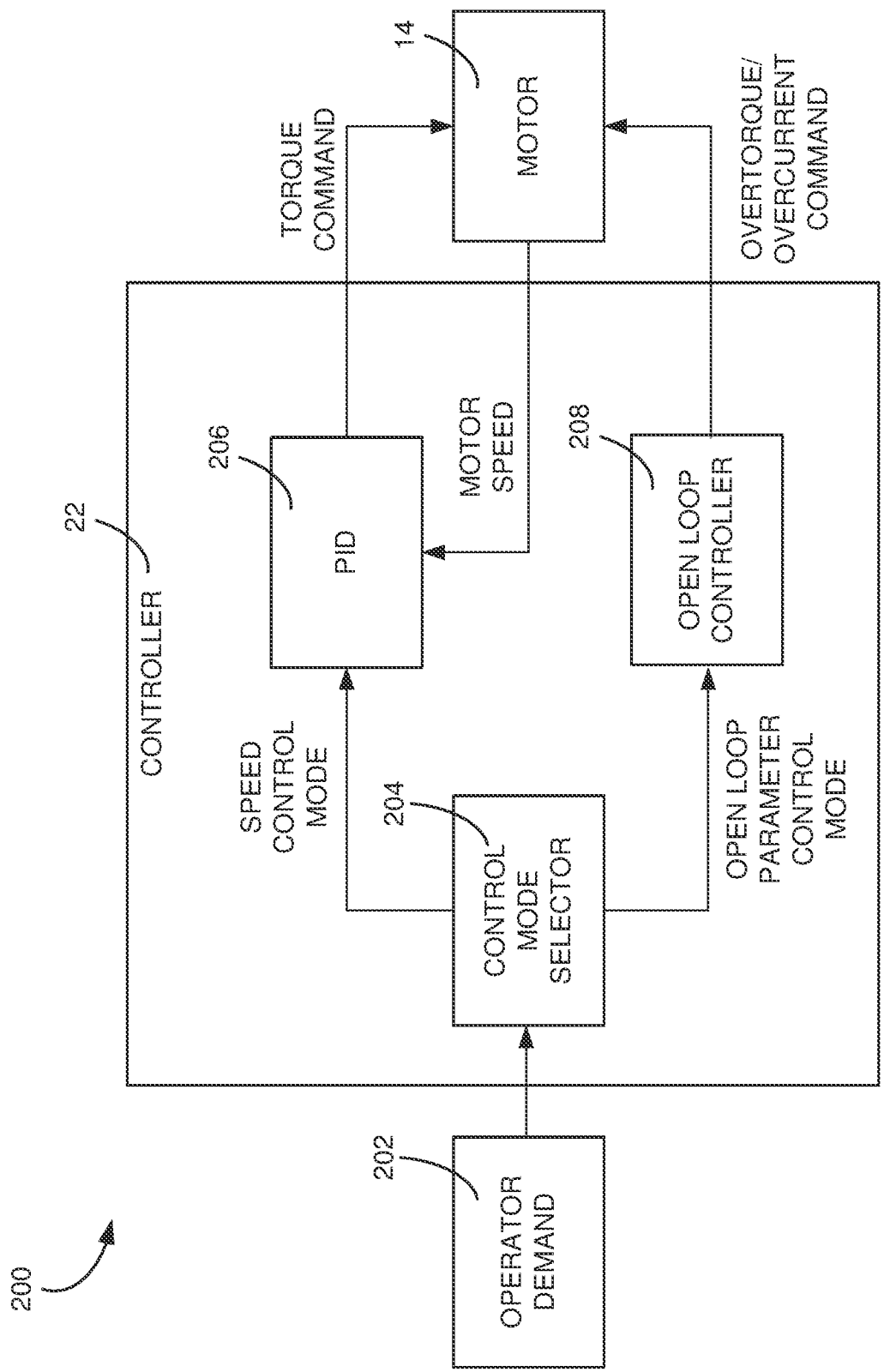
FIG. 2 is a block diagram depicting a control routine executed by a central controller to implement the acceleration boost procedure.

The block diagram of FIG. 2 illustrates an exemplary control routine 200 executed by the controller 22 for controlling the propulsion system 12 including the electric motor 14. At block 202, the operator generates a demand, for example, by rotating the throttle lever 48 of the user interface system 20 in a forward direction away from a neutral or detent position. The demand input signal (e.g., a lever position signal from the lever position sensor 54) is received at a control mode selector 204 within the central controller 22. Based on the amount of the operator demand (i.e., how far the operator rotates the throttle lever 48 away from the neutral or detent position as indicated by the lever position sensor 54), as well as how quickly the operator generates the demand (i.e., how fast the operator moves the throttle lever 48 as indicated by the lever position sensor 54), the control mode selector 204 may operate the motor 14 in a closed-loop speed control mode, such as using a proportional-integral-derivative (PID) controller 206, or in an open loop parameter control mode using an open loop controller 208. For example, the control mode selector 204 may not operate the motor 14 in the open loop parameter control mode unless than the operator demand as indicated by the lever position sensor 54 determines that the operator has moved the throttle lever 48 from a position indicating a helm demand of less than 10% of full power to a position indicating a helm demand of more than 80% of full power, and that the movement of the throttle lever 48 has occurred in less than 2-3 seconds.

For example, if the operator demand signal 202 received by the control mode selector 204 indicates an operator demand that is less than a predetermined thrust threshold and that is requested in a greater amount of time than a predetermined time threshold (e.g., analogous to lightly stepping on an accelerator in a car to accelerate to 30 mph in 10 seconds), the central controller 22 will command the electric motor 14 to operate in the speed control mode using the PID controller 206. For example, the PID controller 206 may utilize a look up table stored in a memory of the PID controller 206 that corresponds the operator demand signal 202 to a target speed that is representative of the speed of the motor 14 and/or a speed of the propeller 18, which is generally proportional to the speed of the marine vessel 10.

Based on the target speed, the PID controller 206 will output a torque command to the motor 14 to reach the target speed, and the measured speed of the motor 14 as measured by the motor speed sensor 30 and/or the speed of the propeller 18 measured by the propeller speed sensor 52 will be provided as feedback to the PID controller 206 to enable closed loop control. In an alternative embodiment, the PID controller may be configured to control motor current, and thus to output a current command to the motor 14, or to control another parameter tied to motor output, and feedback is provided by current sensor 26 or other sensor measuring a corresponding parameter The PID controller 206 will adjust the commanded torque based on the error between the target speed and the measured speed to reach the target speed as a steady state. For example, if the feedback signal provided by the motor speed sensor 30 or the propeller speed sensor 52 to the PID controller 206 indicates that the motor speed has not yet reached the target speed, the PID controller 206 will increase the commanded torque to the motor 14. Conversely, if the feedback signal provided by the motor speed sensor 30 or the propeller speed sensor 52 to the PID controller 206 indicates that the motor speed has exceeded the target speed, the PID controller 206 will decrease the commanded torque to the motor 14.

The speed control mode is representative of the nominal control of the central controller 22 over the motor 14, and while operating in the speed control mode, the PID controller 206 will not command the motor 14 to exceed a rated operation value (e.g., the rated torque value or the rated current value). As described above, the rated torque is the maximum continuous torque that a motor can produce at a rated speed when working normally and without overheating.

However, the present inventors have recognized that in certain short-term scenarios, it is advantageous to command the motor 14 to exceed the rated operation value, such as the rated torque value or rated current value, in order to boost the acceleration performance of the motor 14 and to achieve an on-plane state of the marine vessel 10 more quickly. For example, if the operator demand signal 202 received by the control mode selector 204 indicates an operator demand that exceeds a predetermined thrust threshold (e.g., an increase in demand of greater than 70% of full power) and that is requested in a shorter amount of time than a predetermined time threshold (e.g., 2-3 seconds) as indicated by the movement of the throttle lever 48 measured by the lever position sensor 54, an open loop controller 208 of the central controller 22 will command the electric motor 14 to operate in an open loop parameter control mode such that the motor 14 immediately operates in a maximum torque state without modifying the commanded torque responsive to a feedback signal from the motor 14. In some embodiments, current may be utilized as the control parameter for the motor 14 in place of torque, such that operation in the open loop parameter control mode causes the open loop controller 208 to command the electric motor 14 to immediately operate in a maximum current state that exceeds the rated current of the motor 14. Within the motor 14, a closed loop control scheme may be utilized to achieve the maximum torque state or maximum current state. For example, if the motor 14 receives a command to operate in the maximum torque state from the open loop controller 208, the motor controller 50 may utilize closed loop control by increasing operational current until the error between the maximum commanded torque and the actual torque as measured by the torque sensor 32 is driven to zero.

Further conditions and criteria must be satisfied for the control mode selector 204 to transition the operation of the motor 14 from the speed control mode to the open loop parameter control mode, as well as for the control mode selector 204 to have the motor 14 exit the open loop parameter control mode and return to the speed control mode. These conditions and criteria are addressed below with reference to FIG. 6.

Figure 3:
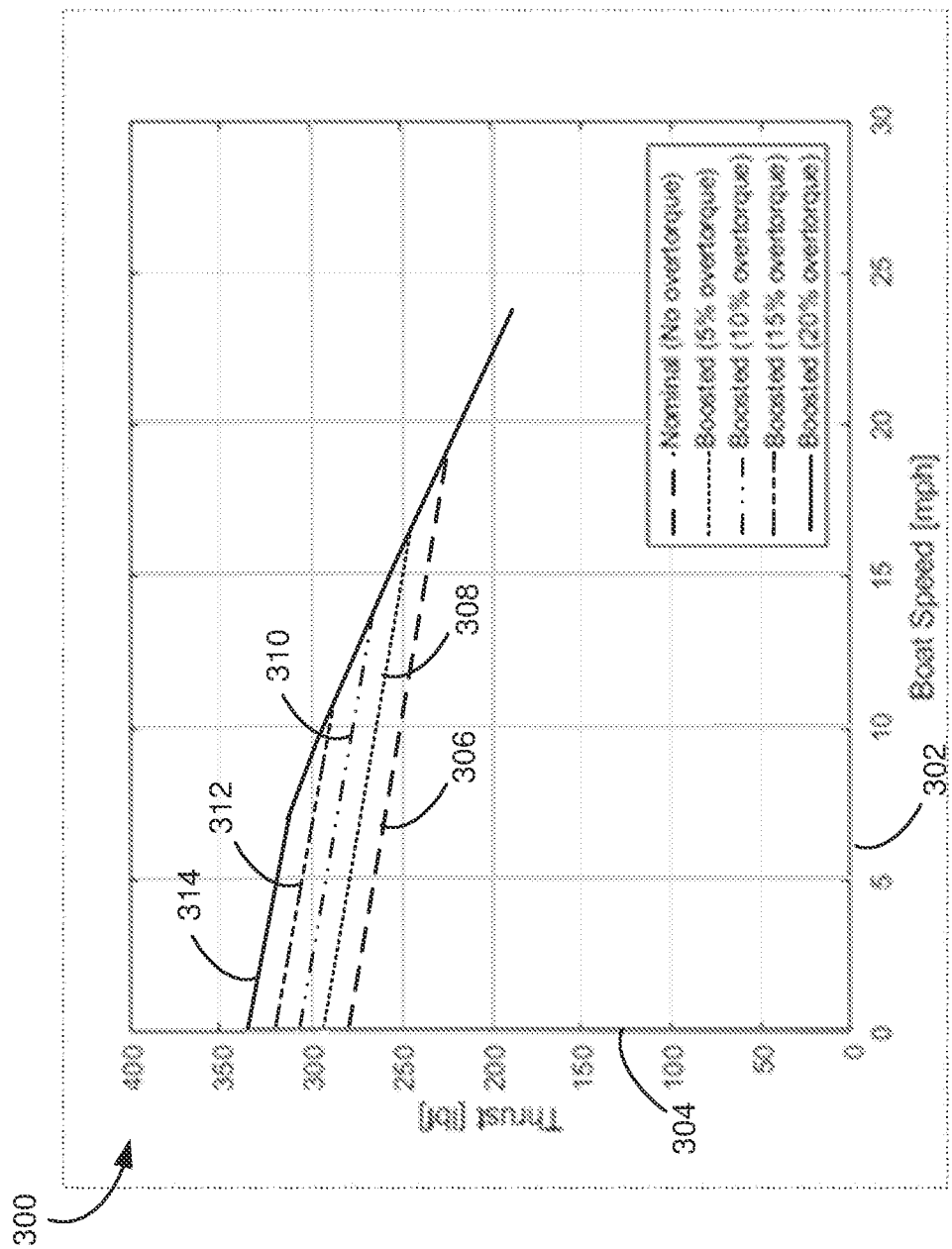
FIG. 3 is a plot depicting the speed of the marine vessel and the thrust generated by the propulsion system of the marine vessel during an acceleration boost process.
Figure 4:
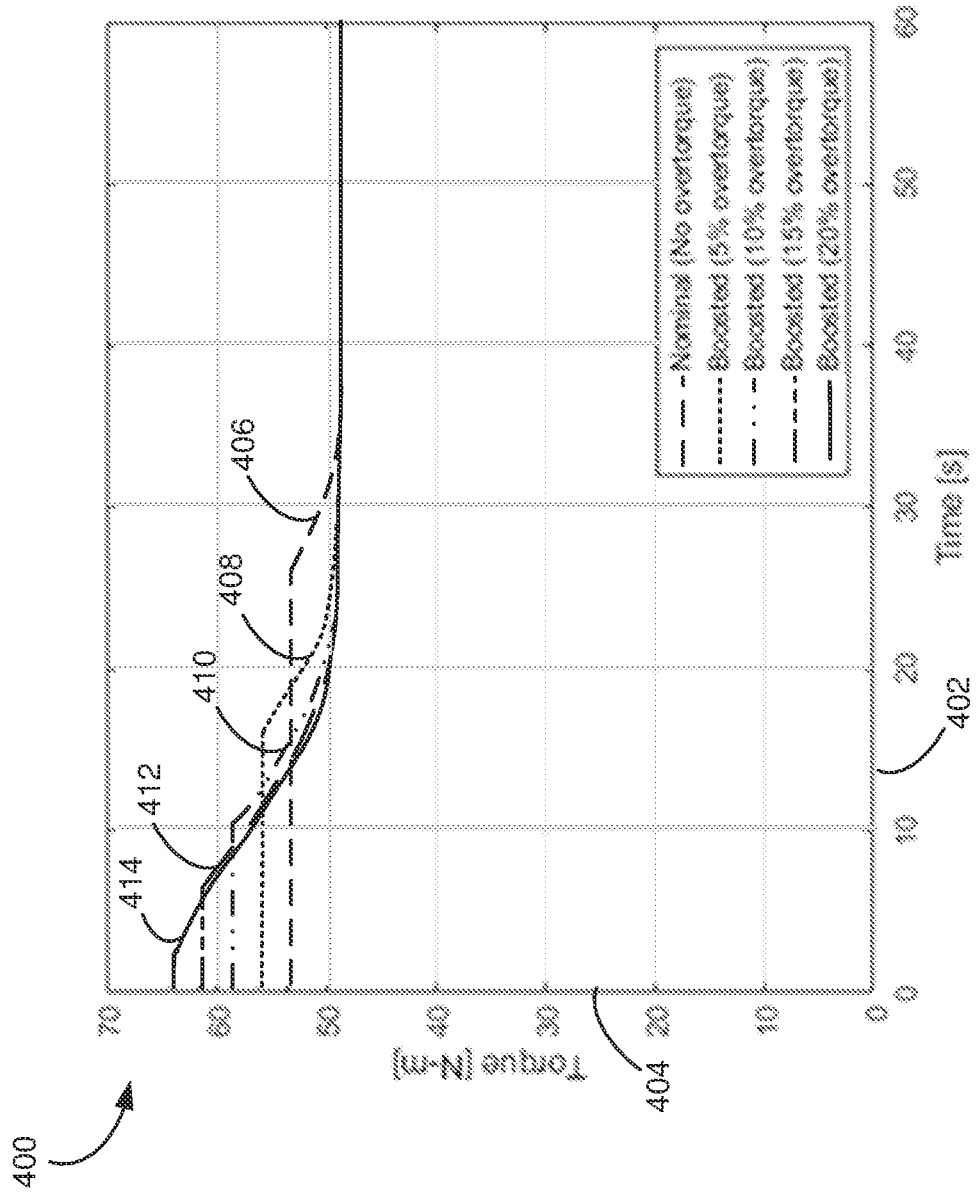
FIG. 4 is a plot depicting the torque generated by the propulsion system of the marine vessel over time during the acceleration boost process.
Figure 5:
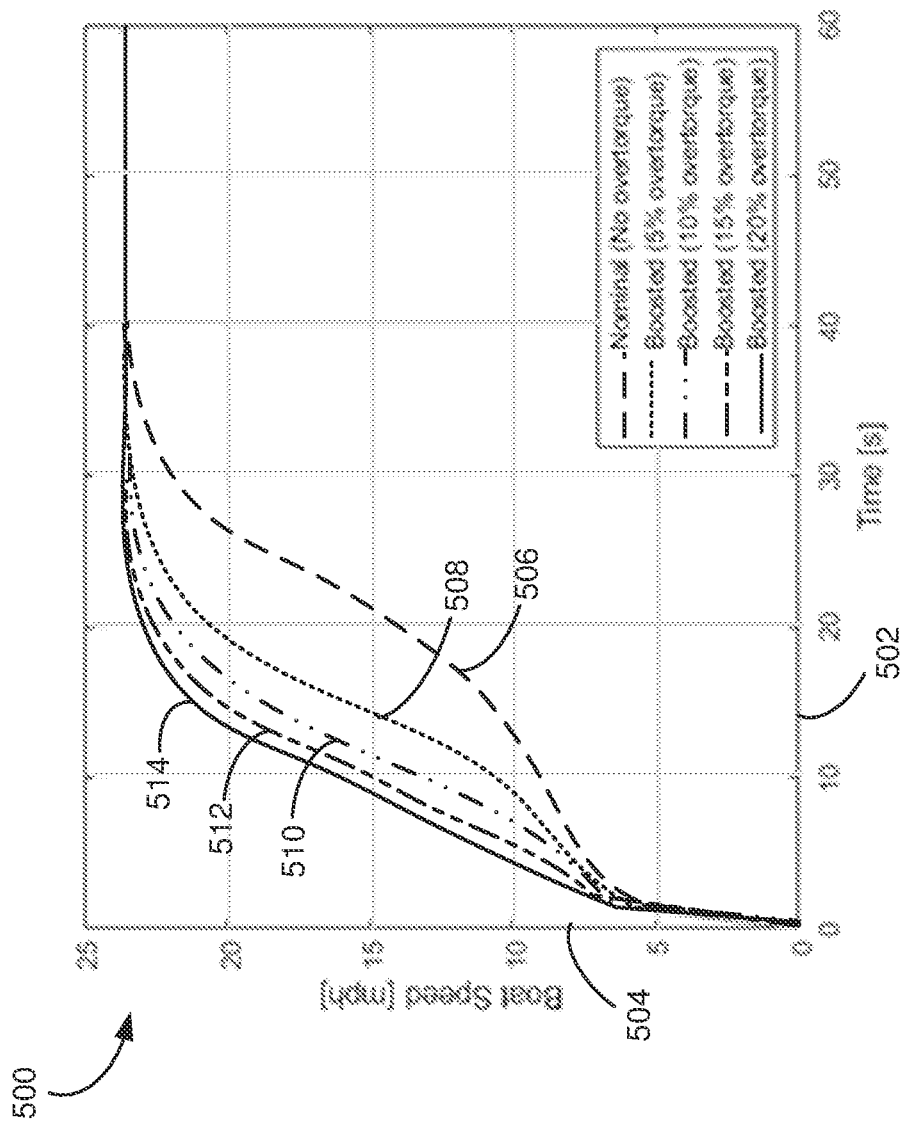
FIG. 5 is a plot depicting speed of the marine vessel over time during the acceleration boost process.

FIGS. 3-5 each depict plots 300-500 illustrating the comparative operation of the marine vessel 10 during nominal operation and in the open loop parameter control mode to provide boosted operation. In the nominal operation mode, that is, unboosted operation when the main controller 22 operates the motor 14 in the closed loop speed control mode, the motor does not exceed rated torque or current values. Plots 300-500 depict operation of the marine vessel 10 in four exemplary open loop parameter control mode embodiments, including a first example where the controller commands 5% overtorque (i.e., 105% of rated torque), a second example where the controller commands 10% overtorque (i.e., 110% of rated torque), a third example where the controller commands 15% overtorque (i.e., 115% of rated torque) and a fourth example where the controller commands 20% overtorque (i.e., 120% of rated torque). Although FIGS. 3-5 each depict multiple discrete overtorque states ranging from 5-20% overtorque, these values are merely exemplary and the amount of overtorque available to be commanded by the open loop controller 208 will depend on the particular characteristics of the motor 14, the battery 34, the propulsion system 12, and/or the marine vessel 10. For example, in some embodiments, the capabilities of the motor 14 will only permit a 10% or 15% overtorque or overcurrent state.

Specifically referring to FIG. 3, a plot 300 illustrating the thrust generated in various overtorque operating conditions is depicted. The plot 300 is shown to include a horizontal axis 302 indicating the speed of the marine vessel 10 in miles per hour (mph) and a vertical axis 304 indicating thrust generated by the motor 14 in pound force (lbf). As shown, the 20% overtorque control modes represented by line 314 generates the highest thrust overall, while the 15% overtorque (line 312), 10% overtorque (line 310), and 5% overtorque (line 308) control modes commanded by the open loop controller 208 all generate higher initial and overall thrust that the nominal operating torque (line 306) commanded by the PID controller 206 during closed loop control.

Each of the control modes represented by lines 306-314 shows that the motor 14 provides the highest thrust before the marine vessel 10 begins moving (i.e., boat speed=0 mph). Once the marine vessel 10 begins moving, the thrust provided by the motor 14 reduces linearly until the marine vessel 10 reaches an on-plane state in which the drag exerted by the body of water in which the marine vessel 10 is situated is significantly reduced. Once the marine vessel 10 reaches an on-plane state, the slope of the linear reduction in thrust provided by the motor 14 increases. As shown, a marine vessel 10 operating in a 20% overtorque control mode may reach on-plane state at approximately 7 mph, while the marine vessel 10 operating in the unboosted condition may not reach the on-plane state until approximately 18 mph.

FIG. 4 depicts a plot 400 illustrating the torque generated by the various overtorque operating conditions. The plot 400 is shown to include a horizontal axis 402 indicating time in seconds and a vertical axis 404 indicating the torque generated by the motor in Newton meters (N-m). As shown, the 20% overtorque control mode embodiment represented by line 414 generates the highest overall torque, although the duration of this high torque condition is the shortest, with the torque generated by the motor 14 beginning to ramp out at approximately 3 seconds until the torque associated with the cruising speed of the marine vessel 10 is achieved. By contrast, the unboosted operating condition represented by line 406 requires approximately 25 seconds of operation under a higher initial torque (e.g., the maximum rated torque of the motor 14) before ramping out the torque associated with the cruising speed. Thus, there is an inverse relationship between the amount of torque provided by the motor 14 and the duration in which it is maintained, with the 15% overtorque control mode embodiment represented by line 412 beginning to ramp out at approximately 6 seconds, the 10% overtorque represented by line 410 beginning to ramp out at approximately 10 seconds, and the 5% overtorque control mode embodiment beginning to ramp out at approximately 16 seconds. The shape of the reduction in torque for the overtorque operating conditions may, in various embodiments, be linear, exponential, a step change, or first order filter, and may be based upon look up tables stored in the open loop controller 208.

FIG. 5 depicts a plot 500 illustrating the speed of the marine vessel 10 under various overtorque operating conditions. The plot 500 is shown to include a horizontal axis 502 indicating time in seconds and a vertical axis 504 indicating the speed of the marine vessel 10 in mph. As shown, the 20% overtorque control mode embodiment represented by line 514 accelerates to the cruising speed of approximately 23 mph the fastest, although both the 15% overtorque control mode embodiment represented by line 512 and the 10% overtorque control mode embodiment represented by line 510 reach the cruising speed at approximately the same time as the 20% overtorque control mode embodiment (i.e., approximately 25 seconds). The 5% overtorque control mode embodiment represented by line 508 reaches the cruising speed at approximately 35 seconds, while the unboosted operating condition represented by line 506 reaches the cruising speed at approximately 40 seconds. Accordingly, even a small boost to acceleration of 5% over the rated operation value (i.e., the rated torque or rated current) can result in reaching the cruising speed significantly faster than unboosted operation.

Figure 6:
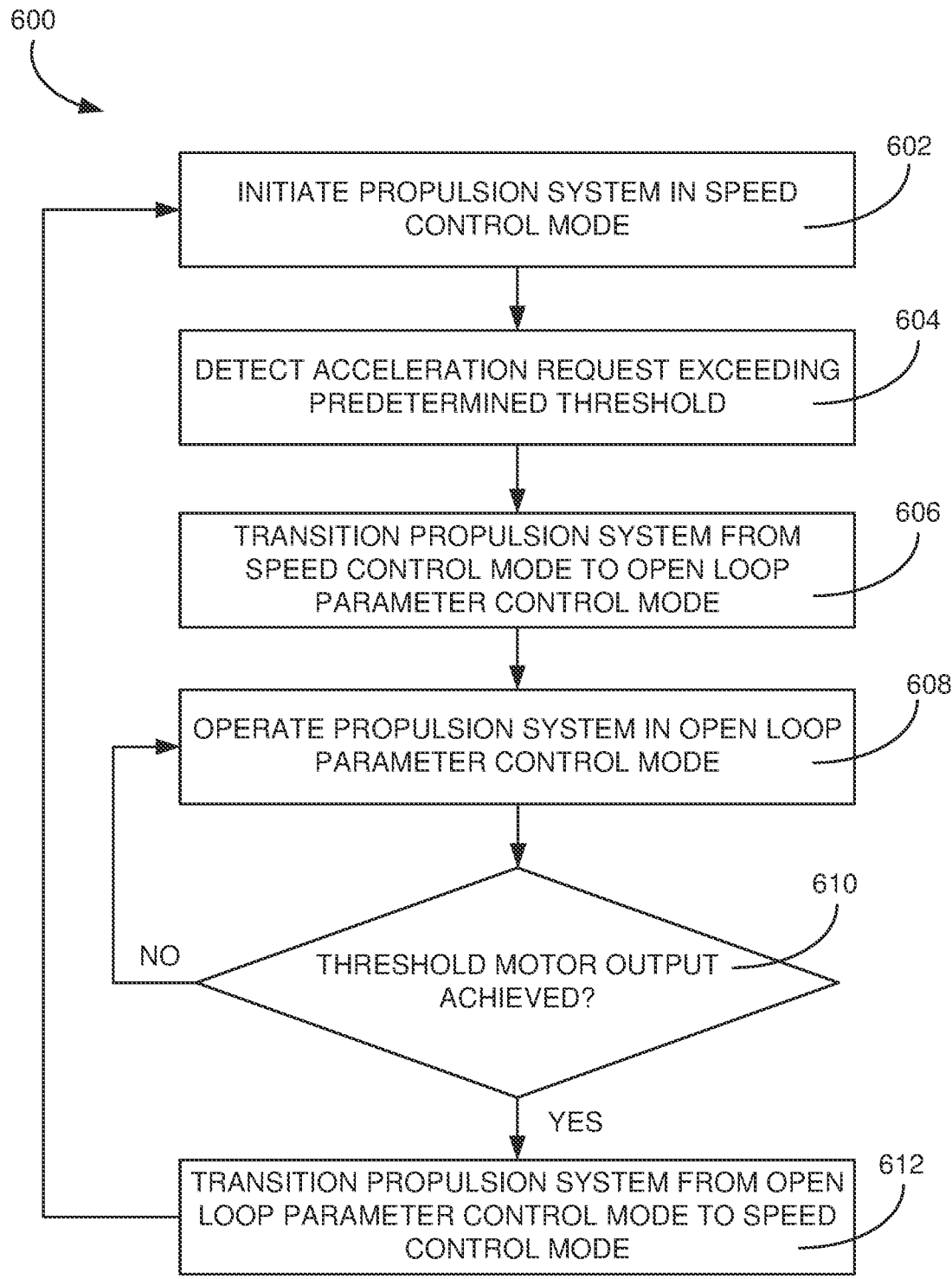
FIG. 6 is a flow chart illustrating an exemplary control method for performing an acceleration boost process.

FIG. 6 depicts one embodiment of a method 600 of controlling an electric marine propulsion system 12 in order to effectuate an acceleration boost operation using the open loop parameter control mode. In an exemplary implementation, method 600 is performed primarily by the central controller 22 and the motor controller 50, among other components. At step 602, the central controller 22 initiates command of the propulsion system 12 in the speed control (i.e., closed loop) control mode. In some embodiments, initiation of the propulsion system 12 occurs upon key-up of the marine vessel 10 but prior to the output of any motor command generated by the central controller 22 and received at the motor controller 50.

At step 604, the control mode controller 204 of the central controller 22 detects an acceleration request (i.e., operator demand 202) that exceeds a predetermined acceleration threshold. As described above, the relevant acceleration threshold may include an operator demand that both exceeds a magnitude of a predetermined thrust threshold and that is requested in a shorter amount of time than a predetermined time threshold. If the control mode controller 204 determines that the operator demand does meet the relevant thresholds, the control mode controller 204 will transition the control of the propulsion system 12 from the speed control mode to the open loop parameter control mode at step 606.

In certain embodiments, the control mode controller 204 may determine whether various other requirements are satisfied before transitioning from the speed control mode to the open loop parameter control mode at step 606. For example, these requirements can include, but are not limited to, determining that a tiller position exceeds a minimum tiller threshold, ensuring that the gear system or transmission 16 is engaged with the propeller 18 in a forward position such that the propeller 18 will propel the marine vessel 10 in a forward position, and, if the operator demand is received at the central controller 22 while the boat is in motion, that the operator demand commands an increase, rather than a decrease, in the speed of the vessel 10. Certain other requirements may determine whether the status of the power storage system 34 permits operation in the open loop parameter control mode. For example, the control mode controller 204 may determine whether a state of charge of the power storage system 34 exceeds a minimum threshold, and that a temperature of a battery enclosure and/or a temperature of an inverter associated with the power storage system 34 does not exceed a maximum threshold.

At step 608, the control mode controller 204 operates the propulsion system 12 in the open loop parameter control mode. As described above, operation in the open loop parameter control mode may comprise commanding the motor 14 to generate an overtorque that exceeds the rated torque of the motor 14. In other embodiments, operation in the open loop parameter control mode may comprise commanding the motor 14 to consume an overcurrent that exceeds the rated current of the motor 14.

At step 610, the central controller 22 will determine whether a threshold motor output is achieved. In various embodiments, the threshold motor output may be a steady state speed of the motor as sensed by the speed sensor 30 or a speed of the propeller 18 as sensed by the propeller sensor 52. In other embodiments, the threshold motor output may be a ramp out torque, that is, a predetermined motor speed prior to reaching the steady state speed as sensed by the speed sensor 30 or the propeller sensor 52. Utilization of a ramp out torque as the threshold motor output may ensure that the motor does not overshoot a targeted speed and cause a slump that may be felt by the operator of the marine vessel 10.

If the threshold motor output has not been achieved at step 610, the central controller 22 continues to operate the motor 14 according to the open loop parameter control mode. If, however, the threshold motor output has been achieved at step 610, method 600 terminates by advancing to step 612, and the central controller 22 transitions operation of the motor 14 from the open loop parameter control mode back to the speed control mode. As described above, the shape of the reduction in torque for the overtorque operating conditions may, in various embodiments, be linear, exponential, a step change, or first order filter, and may be based upon look up tables stored in the open loop controller 208.

In certain embodiments, the threshold motor output will be a different parameter other than a sensed speed of the motor 14 or the propeller 18. For example, the central controller 22 may begin an open loop parameter control timer upon initiation of the open loop parameter control mode, and if the motor 14 fails to achieve a target speed upon expiration of a predetermined time, the central controller 22 will transition operation of the motor 14 back to the speed control mode to avoid overtorqing the motor 14 for an excessive period of time that could result in damage to the motor 14. As another example, if the operator demand decreases while the central controller 22 is operating the motor 14 in the open loop parameter mode, the central controller 22 will transition operation of the motor 14 back to the speed control mode since a decrease in operator demand may indicate an unwillingness of the operator to overtorque the motor 14. In still further embodiments, the threshold motor output is a minimum torque threshold as indicated by the torque sensor 28. For example, if the motor 14 fails to achieve a minimum torque value within a predetermined time, this may indicate that the vessel 10 is not located within a body of water, and transition to the speed control mode is required to prevent damage to the motor.

This written description uses examples to disclose the invention, including the best mode, and to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. An electric marine propulsion system for a marine vessel, comprising:
   a power storage system;
   an electric motor powered by the power storage system and configured to rotate a propulsor to propel the marine vessel;
   a control system configured to operate the electric motor in a speed control mode to generate a variable propulsion output so as not to exceed a rated operation value and an open loop parameter control mode such that the electric motor is operated to exceed the rated operation value to generate a maximum propulsion output, and wherein the control system is further configured to:
   operate the electric motor in the speed control mode;
   receive an operator demand for the electric motor to accelerate the marine vessel;
   determine whether the operator demand exceeds a predetermined acceleration threshold; and
   based at least in part on a determination that the operator demand exceeds the predetermined acceleration threshold, operate the electric motor in the open loop parameter control mode to generate the maximum propulsion output.

2. The electric marine propulsion system of claim 1, wherein the rated operation value is a rated torque for the electric motor and operating the electric motor in the open loop parameter control mode comprises commanding the electric motor to generate a maximum torque output that exceeds the rated torque.

3. The electric marine propulsion system of claim 1, wherein operating the electric motor in the open loop parameter control mode comprises providing a maximum current input to the electric motor.

4. The electric marine propulsion system of claim 1, wherein operating the electric motor in the speed control mode comprises commanding the electric motor to generate a variable torque output based on a comparison of a target speed of the electric motor or a target speed of the propulsor and a feedback signal representative of at least one of a measured speed of the electric motor or a measured speed of the propulsor.

5. The electric marine propulsion system of claim 1, wherein engagement of the open loop parameter control mode is further based in part on a determination that a charge level of the power storage system exceeds a minimum charge threshold.

6. The electric marine propulsion system of claim 1, wherein engagement of the open loop parameter control mode is further based in part on a determination that a temperature of a battery enclosure of the power storage system or a temperature of an inverter associated with the power storage system does not exceed a maximum temperature threshold.

7. The electric marine propulsion system of claim 1, wherein engagement of the open loop parameter control mode is further based in part on a determination that a tiller position exceeds a minimum tiller threshold.

8. The electric marine propulsion system of claim 1, wherein engagement of the open loop parameter control mode is further based in part on a determination that a gear system operably coupling the electric motor to the propulsor is in a forward position configured to enable the propulsor to propel the marine vessel in a forward direction.

9. The electric marine propulsion system of claim 1, wherein engagement of the open loop parameter control mode is further based in part on a determination that the operator demand for the electric motor to accelerate the marine vessel comprises a demand to increase a speed of the marine vessel.

10. The electric marine propulsion system of claim 1, wherein the control system is further configured to:
    detect that the electric motor has achieved a threshold motor output; and
    transition operation of the electric motor from the open loop parameter control mode back to the speed control mode.

11. The electric marine propulsion system of claim 10, wherein the threshold motor output comprises at least one of a steady state speed of the electric motor or a steady state speed of the propulsor.

12. The electric marine propulsion system of claim 1, wherein the control system is further configured to transition operation of the electric motor from the open loop parameter control mode back to the speed control mode upon expiration of a predetermined time after engagement of the open loop parameter control mode.

13. A method of controlling an electric marine propulsion system having an electric motor configured to operate in a speed control mode to generate a variable propulsion output so as not to exceed a rated operation value and in an open loop parameter control mode such that the electric motor is operated to exceed the rated operation value to generate a maximum propulsion output to propel a marine vessel, the method comprising:
    operating the electric motor in the speed control mode;
    receiving an operator demand for the electric motor to accelerate the marine vessel;
    determining whether the operator demand exceeds a predetermined acceleration threshold;
    based at least in part on a determination that the operator demand exceeds the predetermined acceleration threshold, transitioning operation of the electric motor from the speed control mode to the open loop parameter control mode; and
    operating the electric motor in the open loop parameter control mode to generate the maximum propulsion output.

14. The method of claim 13, wherein the rated operation value is a rated torque for the electric motor and operating the electric motor in the open loop parameter control mode comprises commanding the electric motor to generate a maximum torque output that exceeds the rated torque.

15. The method of claim 13, wherein operating the electric motor in the open loop parameter control mode comprises providing a maximum current input to the electric motor.

16. The method of claim 13, wherein operating the electric motor in the speed control mode comprises commanding the electric motor to generate a variable torque output based on a comparison of a target speed of the electric motor or a target speed of the propulsor and a feedback signal representative of at least one of a measured speed of the electric motor or a measured speed of the propulsor.

17. The method of claim 13, wherein operating the electric motor in the open loop parameter control mode is further based in part on a determination that a charge level of a power storage system operably coupled to the electric motor exceeds a minimum charge threshold.

18. The method of claim 13, further comprising:
    detecting that the at least one electric motor has achieved a threshold motor output; and
    transitioning operation of the electric motor from the open loop parameter control mode to the speed control mode.

19. The method of claim 18, wherein the threshold motor output comprises at least one of a steady state speed of the electric motor or a steady state speed of a propulsor operably coupled to the electric motor.

20. The method of claim 13, further comprising transitioning operation of the electric motor from the open loop parameter control mode to the speed control mode upon expiration of a predetermined time after engagement of the open loop parameter control mode.

* * * * *